United States Patent
Kang et al.

(10) Patent No.: US 7,063,448 B2
(45) Date of Patent: Jun. 20, 2006

(54) BACKLIGHT ASSEMBLY AND LIQUID CRYSTAL DISPLAY APPARATUS HAVING THE SAME

(75) Inventors: Sung-Yong Kang, Suwon-si (KR); Jeong-Hwan Lee, Suwon-si (KR); Jong-Dae Park, Seoul (KR); Moon-Shik Kang, Seongnam-si (KR); Keun-Woo Lee, Gyeonggi-do (KR); Sang-Hyuck Youn, Seoul (KR); Hyeong-Suk Yoo, Seongnam-si (KR); Jae-Ho Jung, Yongin-si (KR); Kyu-Seok Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/377,352

(22) Filed: Feb. 28, 2003

(65) Prior Publication Data

US 2004/0001330 A1    Jan. 1, 2004

(30) Foreign Application Priority Data

Jun. 26, 2002    (KR) ............................... 2002-36018

(51) Int. Cl.
| | |
|---|---|
| *F21V 11/00* | (2006.01) |
| *F21V 7/04* | (2006.01) |
| *G02B 5/02* | (2006.01) |
| *H01J 5/16* | (2006.01) |
| *H01P 5/00* | (2006.01) |

(52) U.S. Cl. ...................... 362/558; 362/561; 362/330; 362/337; 362/339

(58) Field of Classification Search ................. 362/31, 362/551, 558, 559, 560, 561, 223, 224, 225, 362/268, 311, 328, 330, 331, 337, 339
See application file for complete search history.

(56) References Cited

U.S. PATENT DOCUMENTS

| 5,359,691 A * | 10/1994 | Tai et al. .................... 385/146 |
| 5,854,872 A * | 12/1998 | Tai .............................. 385/133 |
| 5,971,559 A * | 10/1999 | Ishikawa et al. .............. 362/31 |
| 6,366,409 B1 * | 4/2002 | Umemoto et al. .......... 359/628 |
| 6,494,587 B1 * | 12/2002 | Shaw et al. .................... 362/29 |
| 6,561,663 B1 * | 5/2003 | Adachi et al. .............. 362/616 |
| 6,667,780 B1 * | 12/2003 | Cho ............................ 349/58 |
| 6,679,613 B1 * | 1/2004 | Mabuchi ....................... 362/31 |

\* cited by examiner

*Primary Examiner*—Stephen Husar
*Assistant Examiner*—Sharon Payne
(74) *Attorney, Agent, or Firm*—Cantor Colburn LLP

(57) ABSTRACT

A backlight assembly has a light diffusion member including a diffusion layer for diffusing first light emitted from at least one lamp and a light path modulation layer formed on the diffusion layer to modulate the path of the first light, Therefore, the light diffusion member emits second light having uniform distribution of the brightness. The light path modulation layer may be disposed on one surface of the diffusion layer where the first light is input, or another surface of the diffusion layer where the second light is emitted.

31 Claims, 15 Drawing Sheets

FIG. 16
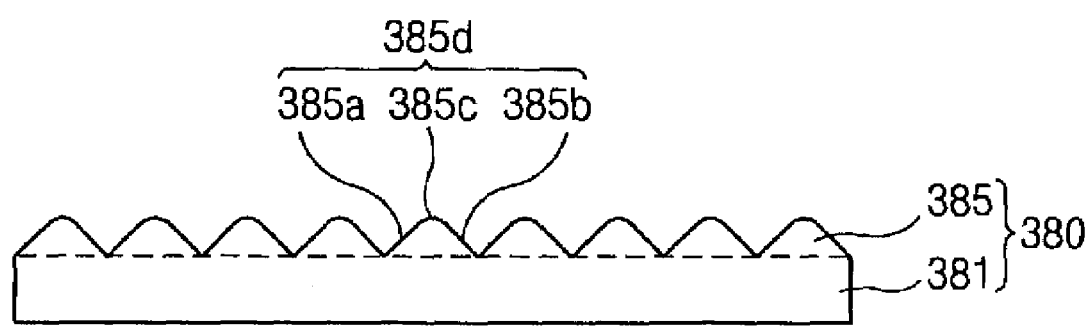
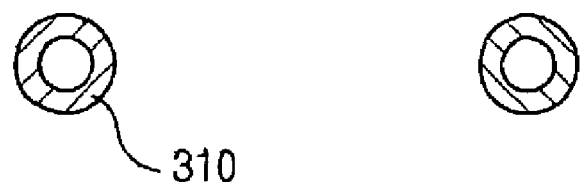

BACKLIGHT ASSEMBLY AND LIQUID CRYSTAL DISPLAY APPARATUS HAVING THE SAME

BACKGROUND OF INVENTION

1. Field of Invention

The present invention relates to a LCD (liquid crystal display) apparatus, and more particularly to a backlight assembly for accomplishing a high brightness and a direct illumination type LCD apparatus having the backlight assembly for improving a display quality.

2. Description of Related Art

Display apparatuses, such as LCD apparatuses, for visually interfacing the data processed by information processing devices have rapidly improved along with the development of the processing devices.

Since LCD apparatuses have a lighter weight and a more compact size than a CRT (Cathode Ray Tube) type display device, as well as full-color and high-solution functions, the LCD apparatuses have been widely used.

The LCD apparatuses convert variations in optical properties of a liquid crystal into variations in visual properties in order to display an image. The LCD apparatuses include a backlight assembly disposed under an LCD panel that supplies a light to the LCD panel to display the image.

Backlight assemblies include a direct illumination type backlight assembly and an edge illumination type backlight assembly in accordance with the position of a lamp installed therein. In the direct illumination type backlight assembly, a light generated from the lamp (which is disposed under an LCD panel) is directly illuminated onto the overall LCD panel. Thus, the direct illumination type backlight assembly may have a higher brightness than that of the edge illumination type backlight assembly, when several lamps are disposed on the LCD panel.

FIG. 1 is a schematic sectional view showing a conventional direct illumination type LCD apparatus.

Referring to FIG. 1, the direct illumination type LCD apparatus 100 includes an LCD panel assembly 110 for displaying an image and a backlight assembly 120 for supplying a light to the LCD panel assembly 110.

The backlight assembly 120 includes one or more lamps 121 for generating a first light, a reflection plate 122 for reflecting the first light and a diffusion plate 123 for diffusing the first light into a second light with a uniform brightness distribution. The lamps 121, reflection plate 122 and diffusion plate 123 are received in a receiving container.

The receiving container includes a bottom mold frame 124 and a bottom chassis 125. The bottom mold frame 124 is combined with the bottom chassis 125 by using hooks. The bottom mold frame 124 includes sidewalls on which the diffusion plate 123 is disposed. The bottom chassis 125 has a box shape wherein an upper face is opened to provide a receiving space having a predetermined depth. The reflection plate 122 is received in the receiving space and the lamps 121 are disposed on the reflection plate 122.

A portion of the first light is directly incident onto the diffusion plate 123 and another portion of the first light is incident onto the diffusion plate 123 after being reflected by the reflection plate 122. The first light is diffused through the diffusion plate 123, and the second light having an emitting angle wider than that of the first light is emitted from the diffusion plate 123.

The conventional direct illumination type LCD apparatus 100, however, has a non-uniform brightness distribution. That is, a first region "A" corresponding to a first illumination region of the lamps 121 has brightness relatively higher than that of a second region "B" corresponding to a second region between the lamps 121, as shown the brightness distribution curve 150 in FIG. 1. Thus, a display quality of the direct illumination type LCD apparatus 100 is deteriorated due to the non-uniform brightness distribution.

To solve the above-mentioned problem, another conventional direct illumination type LCD apparatus has been proposed as shown in FIG. 2.

FIG. 2 is a schematic sectional view showing a conventional direct illumination type LCD apparatus having a diffusion plate including light scattering patterns.

Referring to FIG. 2, a conventional direct illumination type LCD apparatus 160 includes a diffusion plate 123 under which light scattering patterns 123a are formed. The light scattering patterns 123a scatter the first light provided from the lamps 121. Particularly, the light scattering patterns 123a are positioned under the diffusion plate 123 corresponding to the first region "A", so that the light scattering patterns 123a intercept the incident first light onto the first region "A". The second light corresponding to the first region "A" is thus scattered by the scattering patterns and, accordingly, the brightness thereof is reduced. Hence, the brightness difference of the second light between the first and second regions "A" and "B" is reduced, so that the conventional direct illumination type LCD apparatus 160 generally may have a uniform brightness distribution.

However, the light scattering patterns 123a may be easily discolored by the ultraviolet rays emitted from the lamps 121 or the heat generated from the lamps 121 as time goes by. The discolored light scattering patterns 123a are directly projected onto a screen of the direct illumination type LCD apparatus 160, so the display quality of the direct illumination type LCD apparatus 160 may be deteriorated.

In addition, the brightness of the direct illumination type LCD apparatus 160 may be entirely decreased since the light scattering patterns 123a intercept the first light generated from the lamps 121.

BRIEF SUMMARY OF THE INVENTION

The present invention provides a backlight assembly having a high brightness and a high display quality.

The present invention also provides a direct illumination type LCD apparatus comprising the backlight assembly so as to have a high brightness and a high display quality.

In one aspect of the invention, a backlight assembly comprises at least one lamp for generating a first light and a light diffusion member for emitting a second light having a uniform brightness distribution in response to the first light, the light diffusion member comprises a diffusion layer for diffusing the first light and a light path modulation layer protruded from the diffusion layer to modulate a path of the first light.

In a preferred embodiment of the invention, the light path modulation layer may further have at least one protruding portion including a first light path modulation surface inclined at a first angle with a surface of the diffusion layer where the first light is inputted and a second light path modulation surface inclined at a second angle with the surface of the diffusion layer. Further, the light path modulation layer may have at least one protruding portion including a first light path modulation surface inclined at a first angle with a surface of the diffusion layer where the second light is emitted and a second light path modulation surface inclined at a second angle with the surface of the diffusion layer.

In another aspect of the invention, an LCD apparatus comprises at least one lamp for generating a first light, a light diffusion member for diffusing the first light into a second light, the second light having a uniform brightness distribution, the light diffusion member comprising a diffusion layer for diffusing the first light and a light path modulation layer protruded from the diffusion layer to modulate a path of the first light, and an LCD panel for displaying an image in response to the second light from the light diffusion member, the LCD panel being disposed on the light diffusion member.

The LCD apparatus further comprises a first receiving container, which is combined with opposite end portions of the lamp to fix the lamp and on which the light diffusion member is disposed and a second receiving container having a bottom surface and a sidewall extended from the bottom surface for receiving the first receiving container. In a preferred embodiment of the invention, the LCD apparatus is a direct illumination type LCD apparatus.

According to the present invention, the light diffusion member has the diffusion layer for diffusing the light generated by the lamp and the light path modulation layer protruded from the diffusion layer to modulate the path of the light. The light path modulation layer may be disposed on one surface of the diffusion layer to which the light is inputted or another surface of the diffusion layer from which the light is emitted. The light path modulation layer has at least one protruding portion including a first light path modulation surface inclined at a first angle with the first or the second surface of the diffusion layer and a second light path modulation surface inclined at a second angle with the first or the second surface of the diffusion layer.

Therefore, the backlight assembly of the present invention may have improved uniform brightness because the brightness of the light emitted form a lamp may be uniform by the light path modulation layer. The direct illumination type LCD apparatus of the present invention may improve a display quality by using the backlight assembly.

BRIEF DESCRIPTION OF THE DRAWINGS

The above and other advantages of the present invention will become readily apparent with reference to the following detailed description and the accompanying drawings wherein:

FIG. 16 is a schematic sectional view showing a diffusion plate having rounded pitches according to further embodiment of the present invention.

DETAILED DESCRIPTION OF PREFERRED EMBODIMENTS

Figure 1:
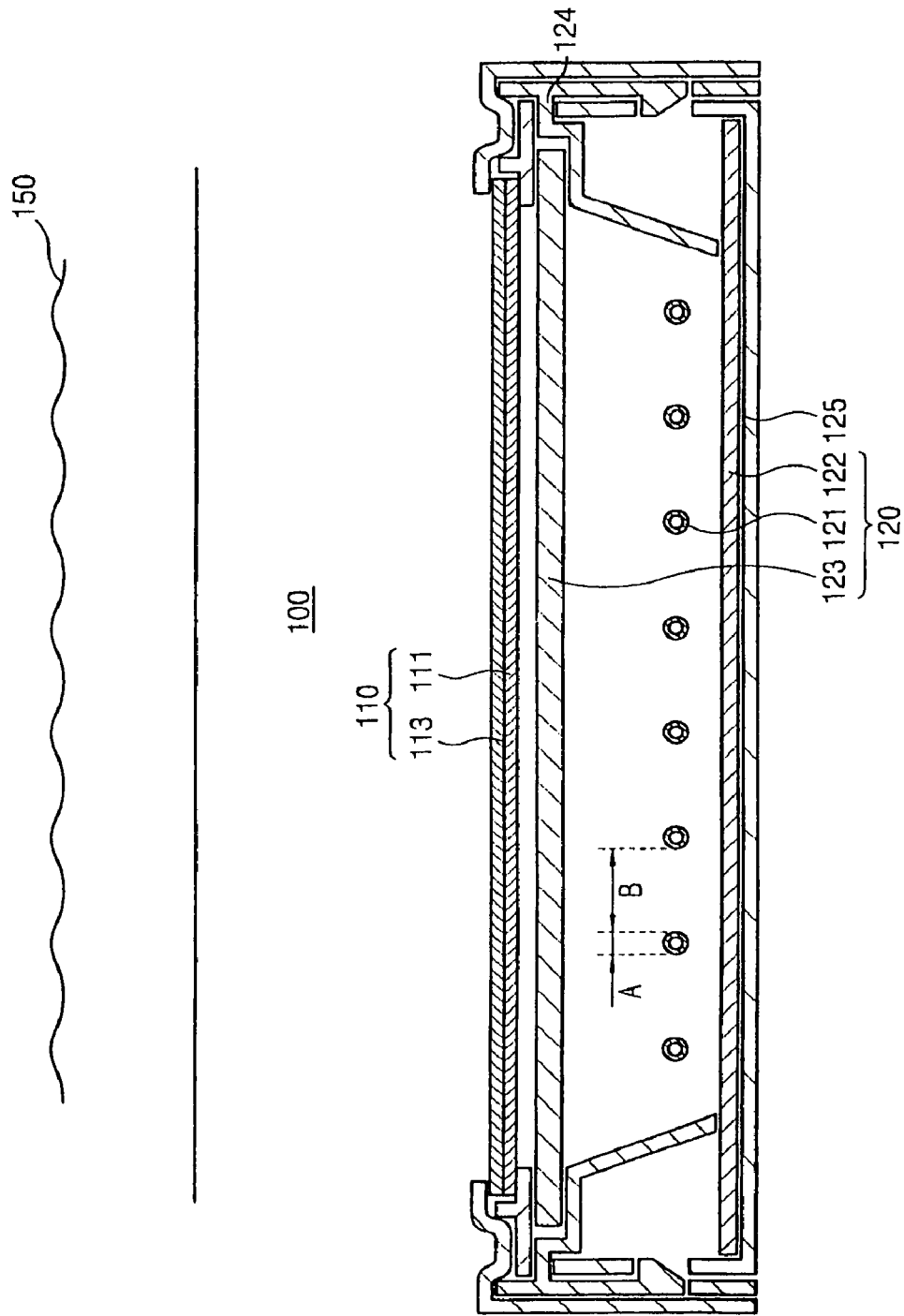
FIG. 1 is a schematic sectional view showing a conventional direct illumination type LCD apparatus.
Figure 2:
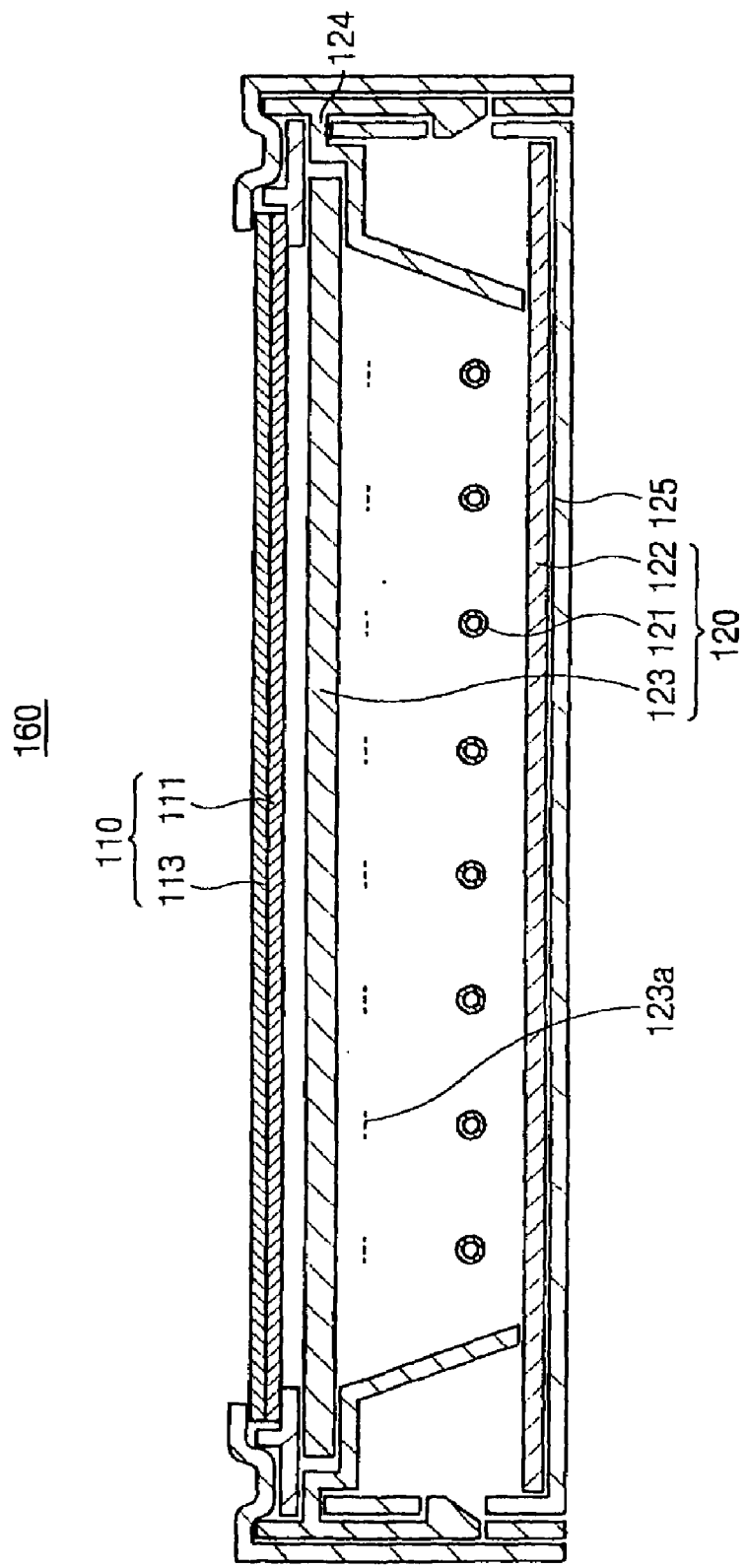
FIG. 2 is a schematic sectional view showing another conventional direct illumination type LCD apparatus.
Figure 3:
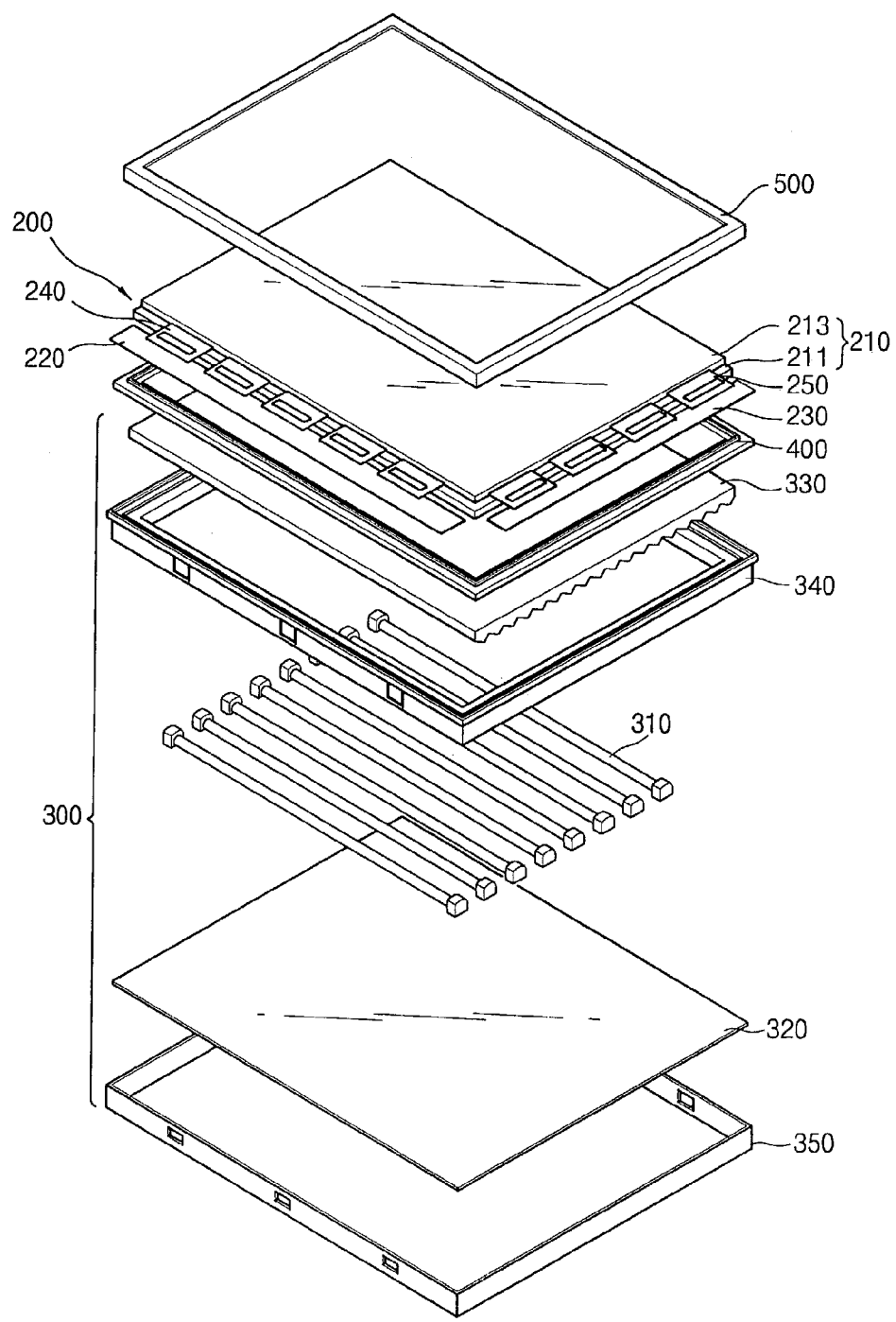
FIG. 3 is an exploded perspective view showing a direct illuminating type LCD apparatus according to an embodiment of the present invention.
Figure 4:
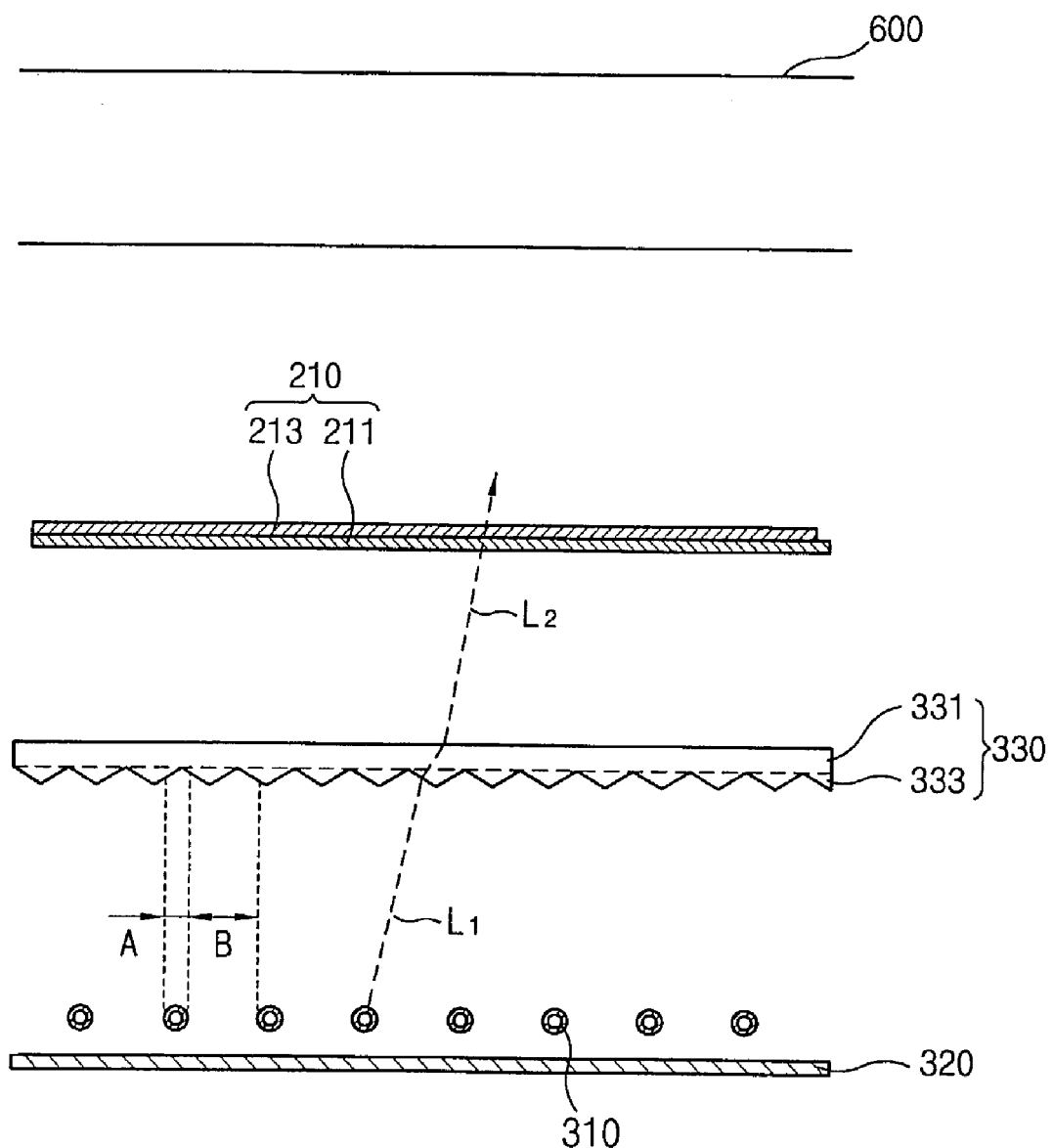
FIG. 4 is a schematic sectional view showing the direct illuminating type LCD apparatus shown in FIG. 3.

FIG. 3 is an exploded perspective view showing a direct illuminating type LCD apparatus according to an embodiment of the present invention. FIG. 4 is a schematic sectional view showing the direct illuminating type LCD apparatus shown in FIG. 3.

Referring to FIGS. 3 and 4, the direct illuminating type LCD apparatus 1000 includes an LCD panel assembly 200 for displaying an image and a backlight assembly 300 for providing a light to the LCD panel assembly 200.

The LCD panel assembly 200 includes an LCD panel 210, a data PCB (PCB) 220, a gate PCB 230, a data TCP (Tape Carrier Package) 240 and a gate TCP 250.

The LCD panel 210 includes a TFT (Thin Film Transistor) substrate 211, a color filter substrate 213 and a liquid crystal (not shown) interposed between the TFT substrate 211 and color filter substrate 213 so as to display the image.

The TFT substrate 211 is a transparent glass substrate on which TFTs are disposed in a matrix configuration for switching signals. Each of the TFTs includes a source terminal connected to a data line, a gate terminal connected to a gate line and a drain terminal having a pixel electrode comprised of a transparent conductive material such as ITO (Indium Tin Oxide).

The color filter substrate 213 is disposed facing to the TFT substrate 211. RGB pixels are color pixels for emitting predetermined colors when the light passes therethrough and formed on the color filter substrate 213 by a thin film process. A common electrode comprised of ITO is disposed on an entire surface of the color filter substrate 213.

The data line disposed on the LCD panel 210 is electrically connected to the data PCB 220 through the data TCP 240 and the gate line disposed on the LCD panel 210 is electrically connected to the gate PCB 230 through the gate TCP 250. After receiving electrical signals, the gate and data PCBs 230 and 220 generate a driving signal and a timing signal for driving and controlling the LCD panel assembly 200 and transmit the driving and timing signals to the gate and data lines through the data and gate TCPs 240 and. 250, respectively.

The backlight assembly 300 includes one or more lamps 310, a diffusion plate 330 and a lamp reflection plate 320.

The lamps 310 emit a first light $L_1$ and the diffusion plate 330 diffuses the first light $L_1$ to emit a second light $L_2$ having a uniform brightness distribution. The lamp reflection plate 320 reflects the first light $L_1$ from the lamps 310 toward the diffusion plate 330.

A receiving container receives the lamps 310, lamp reflection plate 320 and diffusion plate 330. The receiving container includes a bottom mold frame 340 and a bottom chassis 350 combined to each other using hooks.

The bottom chassis 350 includes a bottom surface and sidewalls extended from the bottom surface to provide a receiving space having a predetermined depth. The bottom chassis 350 has, for example, a rectangular hexahedral shape wherein an upper surface is opened. The lamp reflection plate 320 is positioned in the receiving space of the bottom chassis 350 and the lamps 310 are disposed on the lamp reflection plate 320

The bottom mold frame 340 has a rectangular ring shape. Sidewalls of the bottom mold frame 340, which are parallel to the lamps 310, are inclined by predetermined angles. Steps are formed on upper portion of the sidewalls of the bottom mold frame 340 to dispose the diffusion plate 330 thereon.

Although not shown in FIGS. 3 and 4, in order to combine the bottom mold frame 340 with the lamps 310, fixing members (not shown) are disposed on the sidewalls of the bottom mold frame 340 facing end portions of the lamps 310. Thus, the bottom mold frame 340 fixes the lamps 310 at predetermined positions with the fixing members.

The number of the lamps 310 may be varied as the occasion demands although the direct illumination type LCD apparatus 1000 having eight lamps disposed on the lamp reflection plate 320 is shown in FIG. 3.

A portion of the first light $L_1$ is directly incident onto the diffusion plate 330 and another portion of the first light $L_1$ is incident onto the diffusion plate 330 after being reflected from the reflection plate 320.

The diffusion plate 330 includes a diffusion layer 331 and a light path modulation layer 333. The light path modulation layer 333 includes a plurality of protruding portions 333c (see, e.g., FIG. 6) having a prism shape to modulate the path of the light diffused from the diffusion layer 331. Thus, the diffusion plate 330 generates the second light $L_2$ having an emitting angle wider than that of the first light $L_1$, as shown in FIG. 4. In particular, the diffusion layer 331 diffuses the first light $L_1$ and the light path modulation layer 333 modulates the path of the first light $L_1$ using the protruding portions 333c. Hence, the direct illumination type LCD apparatus 1000 has a uniform brightness distribution line 600 as shown in FIG. 4. The diffusion plate 330 will be described in detail with reference to the accompanying drawings.

An upper mold frame 400 is disposed on the bottom chassis 350 where the lamp reflection plate 320, lamps 310 and diffusion plate 330 are successively received. The upper mold frame 400 presses the end portions of the diffusion plate 330, so that the diffusion plate 330 is fixed to the bottom mold frame 340. The upper mold frame 400 has a rectangular ring shape that includes pressing portions protruded from insides thereof and pressing the diffusion plate 330. The upper mold frame 400 faces the end portions of the diffusion plate 330 to press the diffusion plate 330 toward the bottom chassis 350. The LCD panel 210 is disposed on the upper mold frame 400.

A top chassis 500 is provided on the LCD panel 210. The top chassis 500 has, for instance, a shape of a rectangular ring type clamp having opened upper and lower surfaces. The top chassis 500 combines with the bottom chassis 350 to fix the LCD panel 210 to the upper mold frame 400.

Although not shown in FIGS. 3 and 4, the top chassis 500 and the bottom chassis 350 may be combined to each other by using hooks or screws. Also, the top chassis 500 may be combined with the bottom chassis 350 through other general combining methods.

Figure 5:
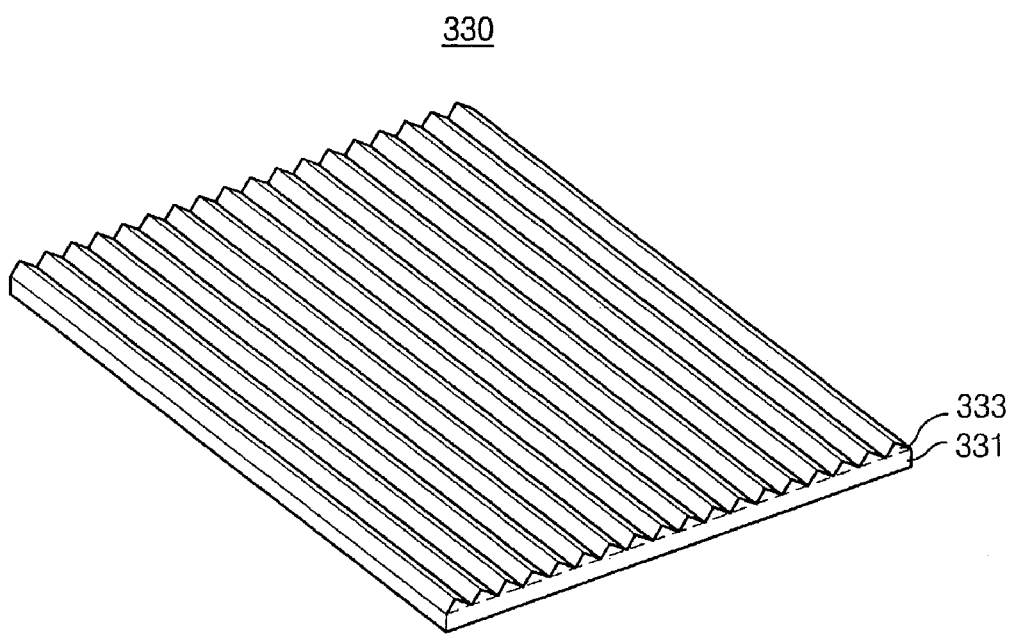
FIG. 5 is a perspective view showing the diffusion plate shown in FIG. 3.
Figure 6:
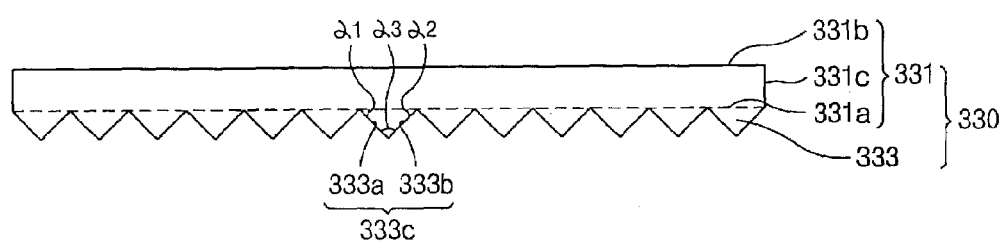
FIG. 6 is an enlarged sectional view illustrating the diffusion plate shown in FIG. 5.

FIG. 5 is a perspective view showing the diffusion plate shown in FIG. 3 and FIG. 6 is an enlarged sectional view illustrating the diffusion plate shown in FIG. 5.

Referring to FIGS. 5 and 6, the diffusion plate 330 includes the diffusion layer 331 and the light path modulation layer 333 protruded from the diffusion layer 331. The diffusion layer 331 includes a first surface 331a on which the light is incident, a second surface 331b from which the light emits and a side surface 331c connecting the first surface 331a to the second surface 331b. The light path modulation layer 333 is disposed on the first surface 331a of the diffusion layer 331.

The light path modulation layer 333 includes one or more protruding portions 333c having a first light path modulation surface 333a and a second light path modulation surface 333b. The first light path modulation surface 333a is inclined from the first surface 331a of the diffusion layer 331 by a first angle $\alpha 1$. The second light path modulation surface 333b is inclined from the first surface 331a of the diffusion layer 331 by a second angle $\alpha 2$ and contacts the first light path modulation surface 333a to form a pitch between the first and second light path modulation surfaces 331a and 331b. The first angle $\alpha 1$ may be substantially identical to the second angle $\alpha 2$.

As shown in FIG. 5, each of the protruding portions 333c of the light path modulation layer 333 has a prism shape extended along the length of the lamps 310 in parallel. The protruding portions 333c are disposed on the entire surface of the first surface 331a of the diffusion layer 331 and each of the protruding portions 333c has the same shape. According to another embodiment of the present invention, the protruding portions 333c of the light path modulation layer 333 may have a dot shape. Also, the protruding portions 333c may have a triangular pyramid shape, a quadrangular pyramid shape or a circular cone shape so that the protruding portions 333c have light path modulation portions inclined with respect to the diffusion layer 331 at a predetermined angle.

Each of the protruding portions 333c has one pitch defined by the first and second light path modulation surfaces 333a and 333b. An internal angle $\alpha 3$ between the first and second light path modulation surfaces 333a and 333b is more than approximately 80° and less than approximately 120°. Preferably, the internal angle $\alpha 3$ is approximately 90°. When the internal angle $\alpha 3$ is 90°, the first light path modulation surface 333a is inclined from the first surface 331a of the diffusion layer 331 by an angle of approximately 45° and also the second light path modulation surface 333b is inclined from the first surface 331a of the diffusion layer 331 by an angle of approximately 45°. The diffusion layer 331 is integrally formed with the light path modulation layer 333. The diffusion layer 331 and the light path modulation layer 333 each comprise an acrylic resin.

Figure 7:
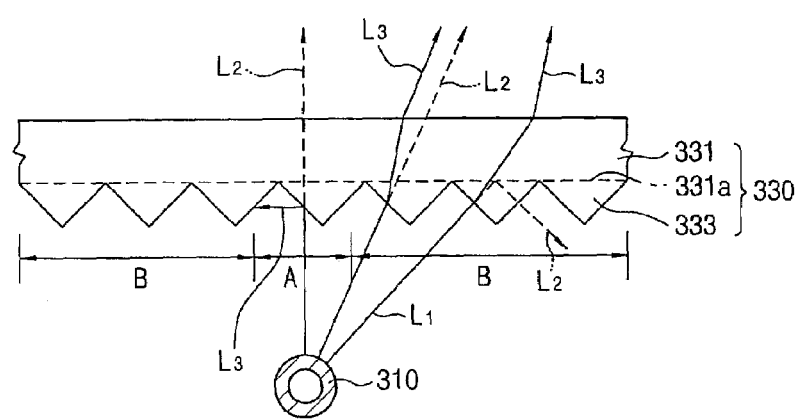
FIG. 7 is an enlarged sectional view illustrating a process for modulating the light path using the diffusion plate shown in FIG. 6.

FIG. 7 is an enlarged sectional view illustrating a process for modulating the light path using the diffusion plate shown in FIG. 6.

Referring to FIG. 7, the first light $L_1$ emitted from the lamps 310 is incident onto the diffusion plate 330. In this case, an air exists between the lamps 310 and diffusion plate 330 because the lamps 310 are separated from the diffusion plate 330 by a predetermined interval. Thus, the first light $L_1$ incident to the diffusion plate 330 is refracted through the diffusion plate 330 by a predetermined refracting angle or reflected from the diffusion plate 330 because a refractive index of the air differs from that of the diffusion plate 330.

When the diffusion plate 330 comprises the acrylic resin, the diffusion plate 330 has a critical angle of about 42.12°. Hence, when the first light $L_1$ incident onto the diffusion plate 330 has an incident angle larger than the critical angle, the light is reflected by a predetermined angle. The first light $L_1$ is refracted by a predetermined angle when the light has an incident angle smaller than the critical angle.

In FIG. 7, a dotted line of an arrow represents a second light $L_2$ emitted from the diffusion plate 330 only including the diffusion layer 331, and a solid line of the arrow represents a third light $L_3$ emitted by the diffusion plate 330 including the diffusion layer 331 and light path modulation layer 333. The first surface 331a of the diffusion layer 331 has a first region "A" corresponding to the lamps 310 and a second region "B" having a brightness lower than that of the first region "A".

Since the first light $L_1$ is generated in a radial pattern from the lamps 310, an internal angle between the first light $L_1$ and the first surface 331a of the diffusion layer 331 gradually decreases as the first light $L_1$ becomes more distant from the first region "A". Thus, the incident angle of the first light $L_1$ to the first surface 331a of the diffusion layer 331 increases with distance from the first region "A". When the incident angle of the first light $L_1$ is larger than the critical angle, the first light $L_1$ is reflected from the first surface 331a of the diffusion layer 331.

Thus, when the diffusion plate 330 includes only the diffusion layer 331, the first light $L_1$ is generally refracted at the first region "A", thereby emitting the second light $L_2$ from the diffusion layer 331 because the incident angle of the first light $L_1$ to the diffusion layer 331 is smaller than the critical angle. The first light $L_1$ is generally reflected from the diffusion layer 331 at the second region "B" because the incident angle of the first light $L_1$ increases as the first light $L_1$ becomes nearer the second region "B". In this case, although the brightness of the first region "A" is relatively lower than that of the second region "B", the brightness difference between the first and second regions "A" and "B" is worse when the first surface 331a of the diffusion layer 331 has a flat surface.

When the diffusion plate 330 includes both the diffusion layer 331 and the light path modulation layer 333, the brightness difference between the first and second regions "A" and "B" is reduced.

The light path modulation layer 333 includes the protruding portions 333c having the first and second light path modulation surfaces 333a and 333b wherein the first and second light path modulation surfaces 333a and 333b are respectively inclined with the first surface 331a of the diffusion layer 331 by predetermined angles.

For instance, when the first and second light path modulation surfaces 333a and 333b are inclined by approximately 45° with respect to the first surface 331a of the diffusion layer 331, the first light $L_1$ inputted onto the first region "A" may be more reflected from the first surface 331a while the first light $L_1$ inputted onto the second region "B" may be less reflected from the first surface 331a. In addition, a portion of the first light $L_1$ inputted to the first region "A" is induced to progress toward the second region "B", thereby compensating the brightness of the second region "B" and decreasing the brightness difference between the first and second regions "A" and "B".

Figure 8:
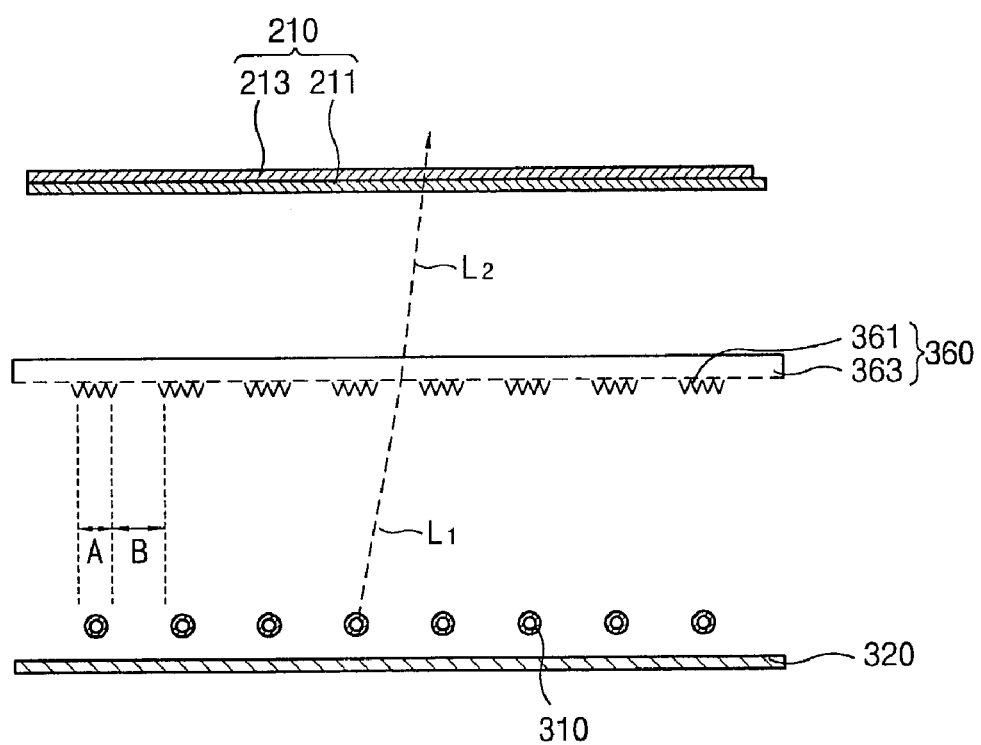
FIG. 8 is a schematic sectional view showing a direct illumination type LCD apparatus according to another embodiment of the present invention.
Figure 9:
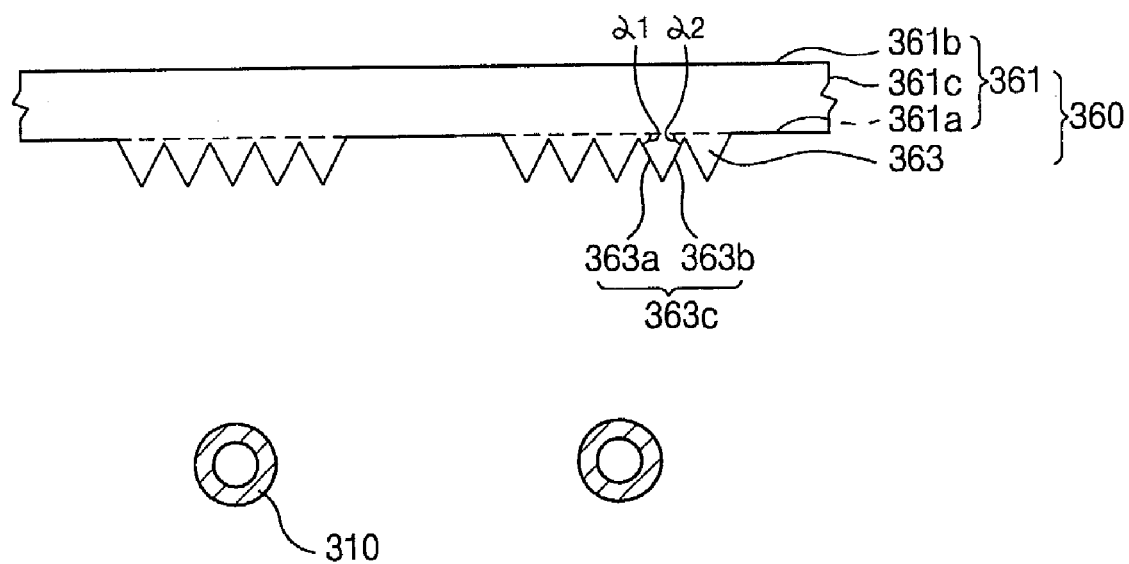
FIG. 9 is an enlarged sectional view illustrating a diffusion plate shown in FIG. 8.

FIG. 8 is a schematic sectional view showing a direct illumination type LCD apparatus according to another embodiment of the present invention. FIG. 9 is an enlarged sectional view illustrating a diffusion plate shown in FIG. 8.

Referring to FIGS. 8 and 9, a diffusion plate 360 of a direct illumination type LCD apparatus according to another embodiment of the present invention includes a diffusion layer 361 and a light path modulation layer 363 protruded from the diffusion layer 361. The diffusion layer 361 diffuses a first light $L_1$ and the light path modulation layer 363 modulates a path of the first light $L_1$, so that the diffusion plate 360 emits a second light $L_2$ having a uniform brightness distribution to an LCD panel 210 including a TFT substrate 211 and a color filter substrate 213.

The diffusion layer 361 includes a first surface 361a on which the first light $L_1$ is incident, a second surface 361b from which the second light $L_2$ is emitted and a side surface connecting the first surface 361a to the second surface 361b. The first surface 361a of the diffusion layer 361 is divided into a first region "A" and a second region "B" having a brightness relatively lower than that of the first region "A".

The light path modulation layer 363 is disposed on the first surface 361a of the diffusion layer 361 on which the first light $L_1$ is incident. For instance, the light path modulation layer 363 is disposed on an area of the first surface 361a corresponding to the first region "A". The light path modulation layer 363 includes one or more protruding portions 363c each having a first light path modulation surface 363a and a second light path modulation surface 363b. The first and second light path modulation surfaces 363a and 363b make contact with each other. The first light path modulation surface 363a is inclined with the first surface 361a of the diffusion layer 361 at a first angle α1 and the second light path modulation surface 363b is also inclined with the first surface 361a at a second angle α2.

The protruding portions 363c disposed on the first region "A" modulate the path of the first light $L_1$ generated from the lamps 310, so that the first light $L_1$ proceeds toward the second region "B". Hence, the brightness of the second region "B" is compensated, and thus the brightness difference between the first and second regions "A" and "B" may be reduced.

Figure 10:
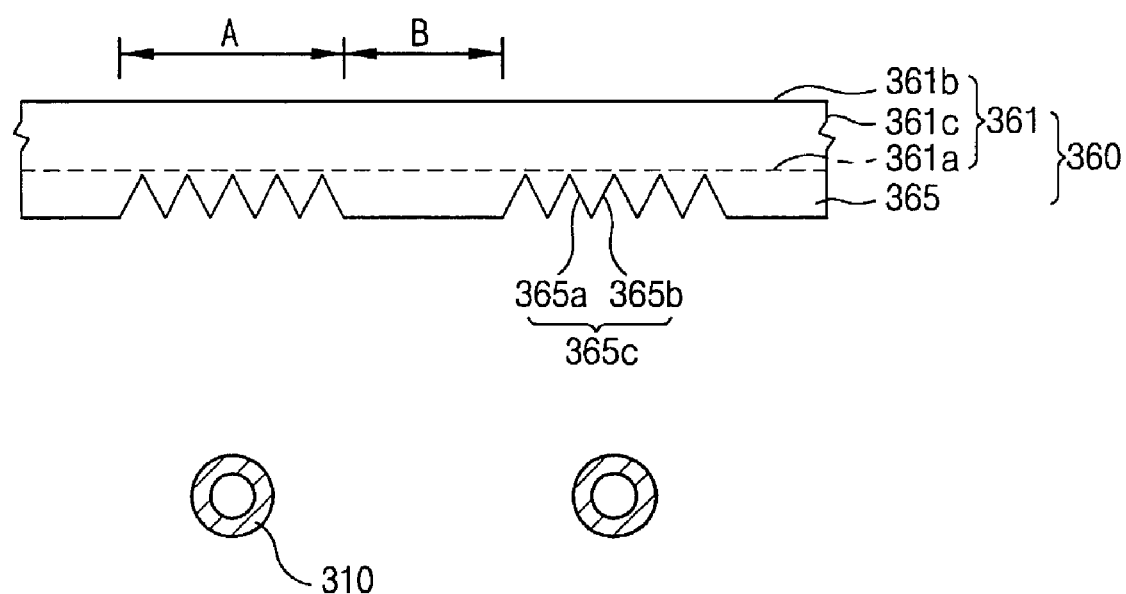
FIG. 10 is a partially enlarged sectional view illustrating a diffusion plate according to another embodiment of the present invention.
Figure 11:
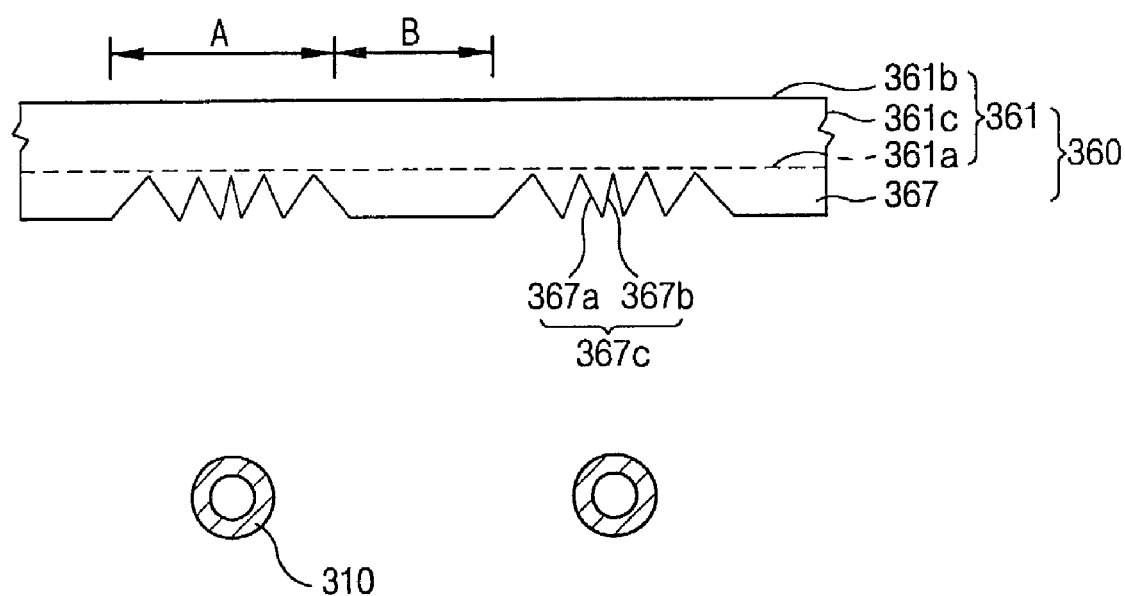
FIG. 11 is a partially enlarged sectional view illustrating a diffusion plate according to another embodiment of the present invention.

FIG. 10 is a partially enlarged sectional view illustrating a diffusion plate according to another embodiment of the present invention. FIG. 11 is a partially enlarged sectional view illustrating a diffusion plate according to another embodiment of the present invention.

Referring to FIG. 10, a diffusion plate 360 according to another embodiment of the present invention, includes a diffusion layer 361 and a light modulation layer 365, and thus the diffusion plate 360 receives a first light $L_1$ and emits a second light $L_2$ having an emitting angle larger than that of the first light $L_1$. The diffusion layer 361 diffuses the first light $L_1$, and the light path modulation layer 365 protruded from the diffusion layer 361 changes a path of the first light $L_1$.

The diffusion layer 361 includes a first surface 361a, a second surface 361b and a side surface 361c. The first light $L_1$ is incident onto the first surface 361a, and the second light $L_2$ emits from the second surface 361b. The first and second surfaces 361a and 361b are connected by the side surface 361c. The first surface 361a of the diffusion layer 361 comprises a first region "A" and a second region "B" having brightness relatively lower than that of the first region "A".

The light path modulation layer 365 is disposed on the first surface 371a of the diffusion layer 361. The light path modulation layer 365 has a plurality of protruding portions 365c, each of the protruding portions 365c includes first light path modulation surfaces 365a and second light path modulation surfaces 365b. The plurality of protruding portions 365c is protruded with respect to the first surface 361a. The plurality of protruding portions 365c is disposed on a region of the first surface 361a corresponding to the first region "A".

Referring to FIG. 11 a diffusion plate 360 according to another embodiment of the present invention, includes a diffusion layer 361 and a light modulation layer 367, and thus the diffusion plate 360 receives a first light $L_1$ and emits a second light $L_2$ having an emitting angle larger than that of the first light $L_1$. The diffusion layer 361 diffuses the first light $L_1$, and the light path modulation layer 367 protruded from the diffusion layer 361 changes a path of the first light $L_1$.

The light path modulation layer 367 is disposed on the first surface 361a of the diffusion layer 361. The light path modulation layer 367 has a plurality of protruding portions 367c, each of the protruding portions 367c includes first light path modulation surfaces 367a and second light path modulation surfaces 367b. The plurality of protruding portions 367c is protruded with respect to the first surface 361a. The plurality of protruding portions 367c is disposed on a region of the first surface 361a corresponding to the first region "A". Each size of the plurality of protruding portions 367c increases in proportion to a distance between center of the first region "A" and the protruding portion 367c. In other words, the protruding portion 367c has a maximum size at the boundary area between the area "A" and "B", and the protruding portion 367c has a minimum size at the center of the first region "A".

Figure 12:
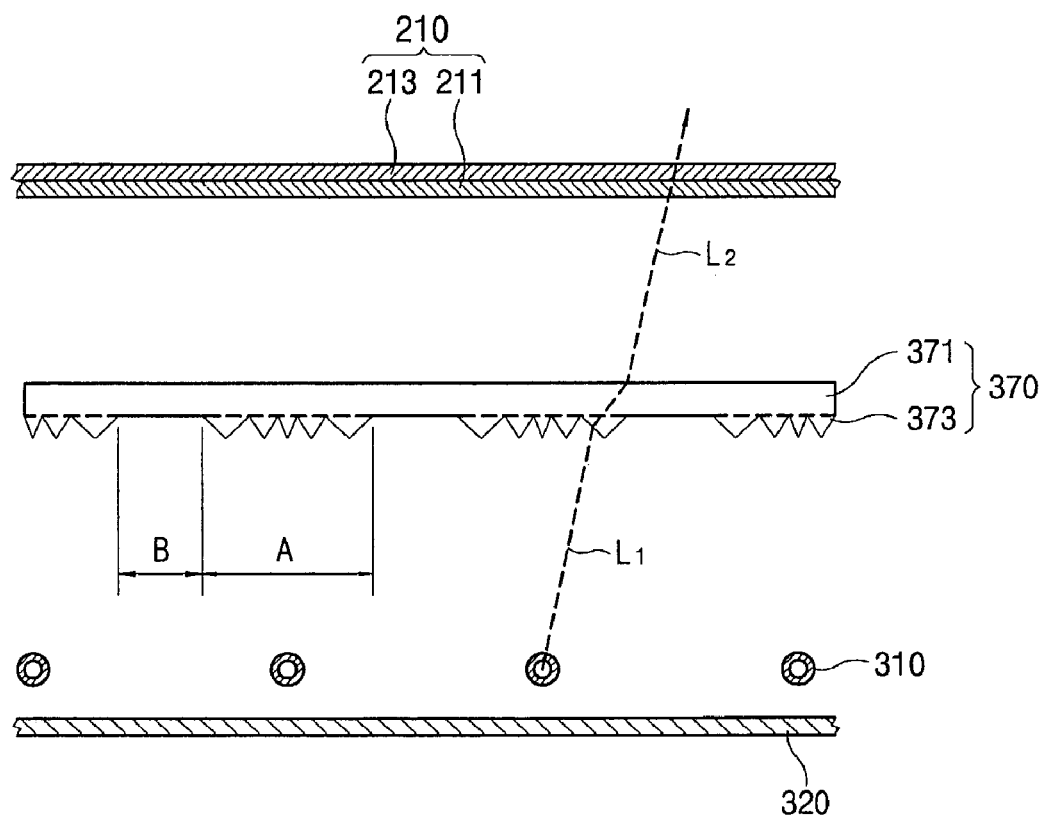
FIG. 12 is a schematic sectional view showing a direct illumination type LCD apparatus according to another embodiment of the present invention.
Figure 13:
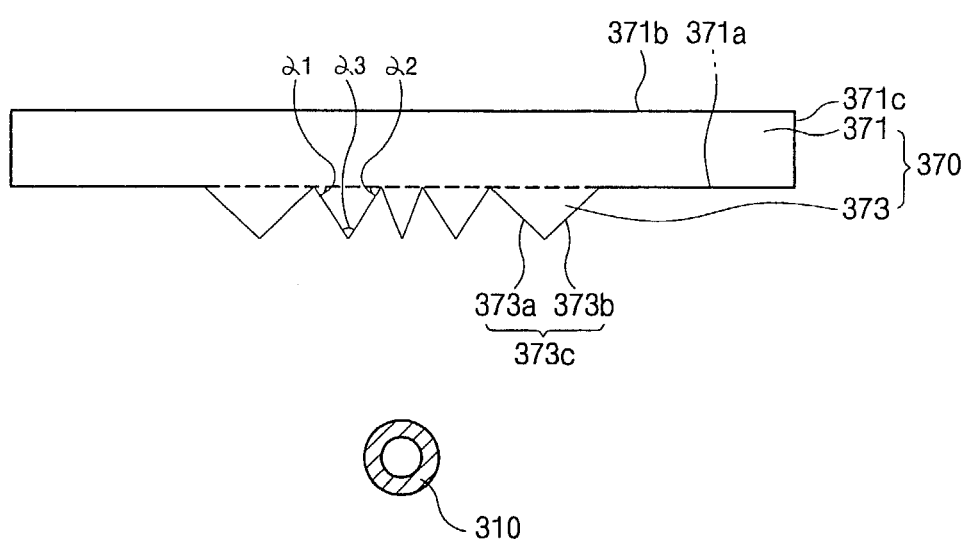
FIG. 13 is an enlarged sectional view illustrating a diffusion plate shown in FIG. 12.

FIG. 12 is a schematic sectional view showing a direct illumination type LCD apparatus according to another embodiment of the present invention. FIG. 13 is an enlarged sectional view illustrating a diffusion plate shown in FIG. 12.

Referring to FIGS. 12 and 13, a diffusion plate 370 of a direct illumination type LCD apparatus, according to another embodiment of the present invention, includes a diffusion layer 371 and a light path modulation layer 373, and thus the diffusion plate 370 receives a first light $L_1$ and emits a second light $L_2$ having an emitting angle wilder that that of the first light $L_1$ to a LCD panel 210 including a TFT substrate 211 and a color filter substrate 213. The diffusion layer 371 diffuses the first light $L_1$ and the light path modulation layer 373, which is protruded from the diffusion layer 371, modulates a path of the first light $L_1$, The diffusion layer 371 includes a first surface 371a, a second surface 371b and a side surface 371c. The first light $L_1$ is incident onto the first surface 371a and the second light $L_2$ is emitted from the second surface 371b. The first and second surfaces 371a and 371b are connected by the side surface 371c. The first surface 371a of the diffusion layer 371 comprises a first region "A" and a second region "B" having a brightness relatively lower than that of the first region "A".

The light path modulation layer 373 is disposed on the first surface 371a of the diffusion layer 371 and the light path modulation layer 373 is corresponding the first region "A". The light path modulation layer 373 has a plurality of protruding portions 373c each including first light path modulation surfaces 373a and second light path modulation surfaces 373b. The first light path modulation surface 373a is inclined from the first surface 371a of the diffusion layer 371 by a first angle $\alpha 1$ and the second light path modulation surface 373b is inclined from the first surface 371a by a second angle $\alpha 2$. The second light path modulation surface 373b makes contact with the first light path modulation surface 373a.

Each of the protruding portions 373c has a prism shape prolonged along the length of the lamps 310. For instance, the sizes of the protruding portions 373c increase as the protruding portions 373c is getting close to the second region "B". The heights of the protruding portions 373c are substantially identical to each other. The sizes of the protruding portions 373c are measured by cutting the protruding portions 373c along the direction perpendicular to the length of the lamps 310.

As shown in FIG. 13, each of the protruding portions 373c includes one pitch defined by the first and second light path modulation surfaces 373a and 373b. An internal angle $\alpha 3$ between the first and second light path modulation surfaces 373a and 373b increases as the protruding portions 373c is getting close to the second region "B".

As the internal angle $\alpha 3$ increases, the first angle $\alpha 1$ between the first light path modulation surface 373a and the first surface 371 gradually decreases and the second angle $\alpha 2$ between the second light path modulation surface 373b and the first surface 371a gradually decreases. As the slopes of the first and second light path modulation surfaces 373a and 373b are reduced, the amount of first light $L_1$ provided onto the diffusion layer 371 through the light path modulation layer 373 may increase because the first light $L_1$ is not reflected from the light path modulation layer 373. Therefore, the brightness difference between the first and second region "A" and "B" may be reduced. In this case, the internal angle $\alpha 3$ is more than about 80° to less than about 180°.

The light path modulation layer 373 refracts the first light $L_1$ proceeding in the direction perpendicular to the first surface 371a by using the protruding portions 373c disposed on the first region "A", so that the first light $L_1$ proceed toward the second region "B". Thus, the second light $L_2$ is emitted from the diffusion layer 371 through the light path modulation layer 373, thereby reducing the brightness difference between the first and second region "A" and "B".

Figure 14:
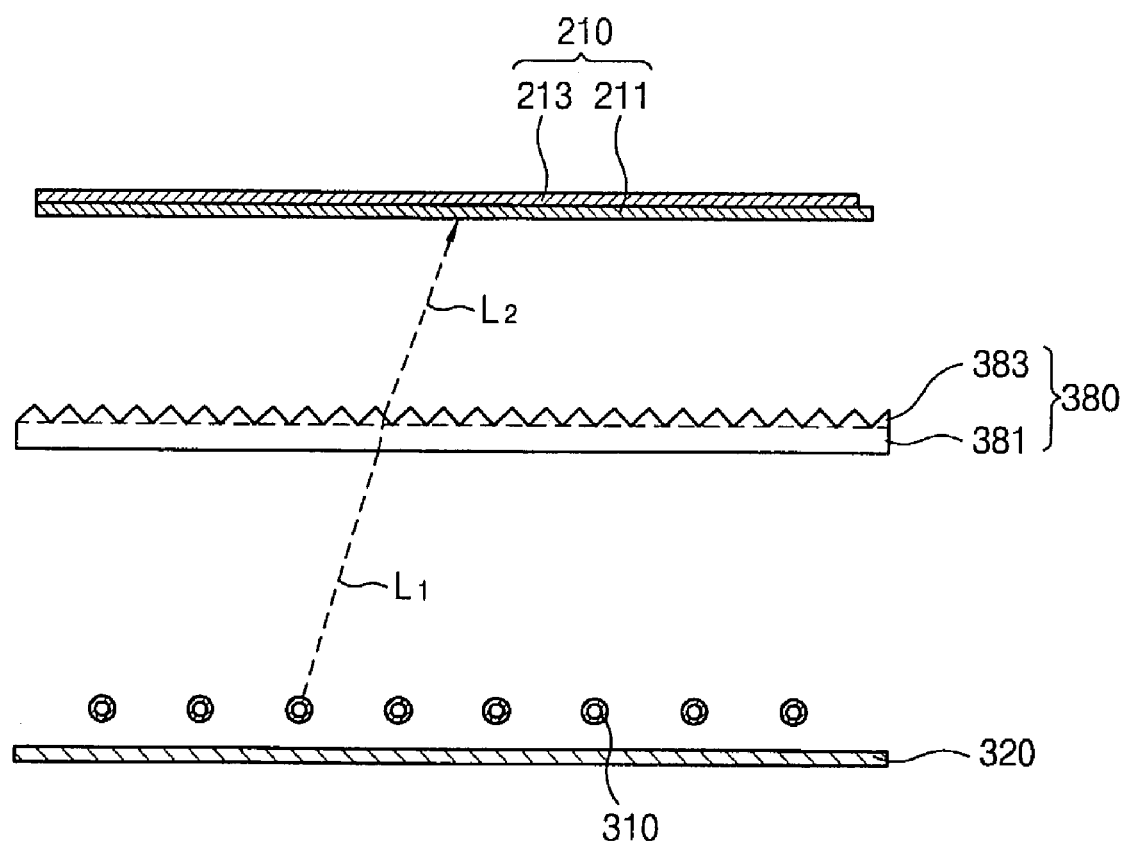
FIG. 14 is a schematic sectional view showing a direct illumination type LCD apparatus according to another embodiment of the present invention.
Figure 15:
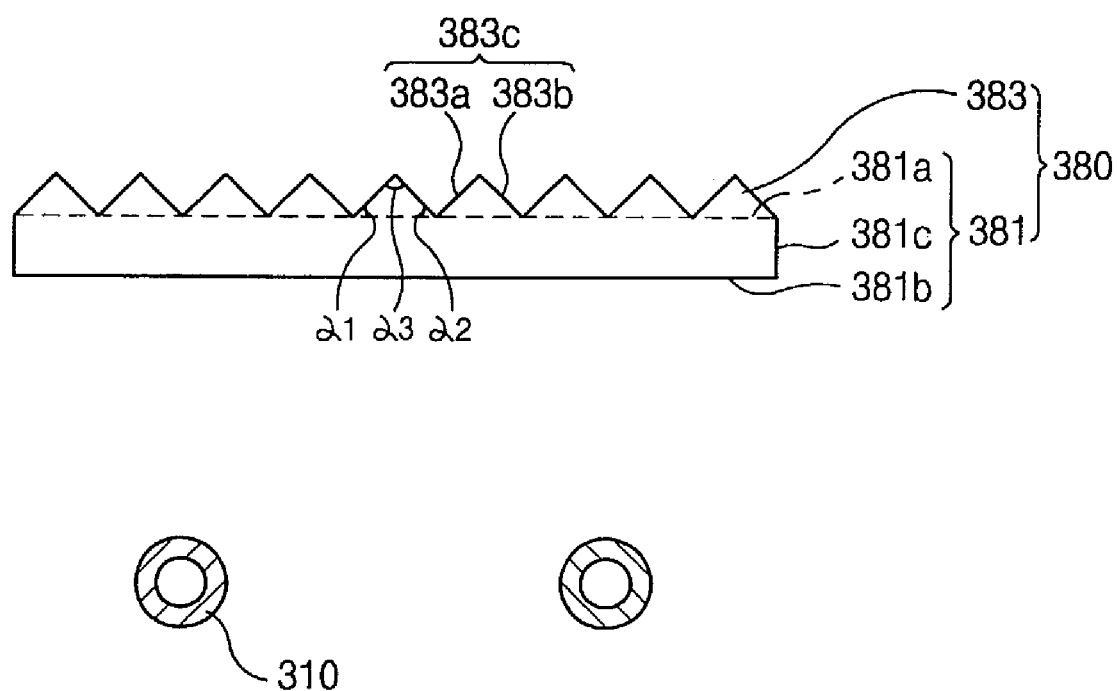
FIG. 15 is an enlarged sectional view illustrating a diffusion plate shown in FIG. 14.

FIG. 14 is a schematic sectional view showing a direct illumination type LCD apparatus according to an another embodiment of the present invention. FIG. 15 is an enlarged sectional view illustrating a diffusion plate in FIG. 14.

Referring to FIGS. 14 and 15, a diffusion plate 380 of a direct illumination type LCD apparatus, according to another embodiment of the present invention, includes a diffusion layer 381 for diffusing the first light $L_1$ and a light path modulation layer 383 having a prism shape protruded from the diffusion layer 381 to modulate a path of the first light $L_1$.

The diffusion layer 381 includes a first surface 381a for receiving the first light $L_1$, a second surface 381b for emitting the second light $L_2$ and a side surface 381c connecting the first surface 381a to the second surface 381b. The light path modulation layer 383 is disposed on the second surface 381b of the diffusion layer 381.

The light path modulation layer 383 includes a plurality of protruding portions 383c having a first light path modulation surface 383a and a second light path modulation surface 383b making contact with the first light path modulation surface 383a. The first light path modulation surface 383a is inclined from the second surface 381b of the diffusion layer 381 by a first angle $\alpha 1$. Also, the second light path modulation surface 383b is inclined from the second surface 381b by a second angle $\alpha 2$.

Each of the protruding portions 383c has a prism shape prolonged along the length of the lamp 310 in parallel. For instance, the protruding portions 383c are disposed on the entire surface of the second surface 381b of the diffusion layer 381 and each of the protruding portions 383c has the same shape. In addition, each of the protruding portions 383c has a pitch defined by the first light path modulation surface 383a and the second light path modulation surface 383b.

An internal angle α3 between the first and second light path modulation surfaces 383a and 383b has more than about 80° to less than about 120°. Each protruding portion 383c, for example, has a width less than approximately 0.635 mm.

When the protruding portions 383c are cut in a direction perpendicular to the length of the lamps 310, the protruding portions 383c have triangular shapes defined by the second surface 381b, first light path modulation surface 383a and the second light path modulation surface 383b, respectively. The protruding portions 383c have isosceles triangular shapes in which the length of the first light path modulation surface 383a is the same to that of the second light path modulation surface 383b.

Since the diffusion plate 380 has the light path modulation layer 383 that includes a plurality of protruding portions 383c having the prism shape, the diffusion plate 380 may function as a light concentrator like to a prism sheet of an LCD apparatus. Therefore, a thickness and a weight of a direct illumination type LCD apparatus according to the present invention may be reduced by eliminating the prism sheet.

FIG. 16 is a schematic sectional view showing a diffusion plate having rounded pitches according to further embodiment of the present invention.

Referring to FIG. 16, a diffusion plate 390 according to further embodiment of the present invention includes a diffusion layer 391 and a light path modulation layer 395 disposed on a surface of the diffusion layer 391 where a light is emitted.

The light path modulation layer 395 includes a plurality of protruding portions 395d having a first light path modulation surface 395a and a second light path modulation surface 395b. Each of the protruding portions 395 has a pitch 395c defined by the first light path modulation surface 395a and the second light path modulation surface 395b. For instance, the pitch 395c may have a round surface corresponding to a region where the first light path modulation surface 395a meets the second light path modulation surface 395b. Thus, the diffusion plate 390 may have a good durability against an external shock.

According to the present invention, a light diffusion plate includes a diffusion layer for diffusing a light and a light path modulation layer protruded from the diffusion layer to modulate the path of the diffused light. The light path modulation layer may be disposed on a first surface for receiving the light of the diffusion layer, or a second surface for emitting the light of the diffusion layer. The light path modulation layer has one or more protruding portions including a first light path modulation surface inclined by a first angle from the first or the second surface of the diffusion layer and a second light path modulation surface inclined from the first or the second surface of the diffusion layer by a second angle.

Therefore, the backlight assembly of the present invention may have uniform brightness because the brightness of the light emitted form a lamp may be uniform by the light path modulation layer. In addition, the direct illumination type LCD apparatus including the backlight assembly of the present invention may have an enhanced display quality.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A backlight assembly comprising:
   at least one lamp that generates a first light; and
   a light diffusion member that is disposed over the lamp and diffuses the first light to generate a second light having a uniform brightness distribution, the light diffusion member comprising:
      a diffusion layer that diffuses the first light; and
      a light path modulation member protruded from the diffusion layer to modulate a path of the first light,
   wherein the diffusion layer includes a first region from which the light path modulation member is protruded and a second region having a flat surface, the at least one lamp corresponding to the first region.

2. The backlight assembly according to claim 1, wherein the light path modulation member comprises at least one protruding portion, the protruding portion comprising:
   a first light path modulation surface inclined at a first angle with respect to a surface of the diffusion layer where the first light is inputted; and
   a second light path modulation surface inclined at a second angle with respect to the surface of the diffusion layer.

3. The backlight assembly according to claim 2, wherein the at least one protruding portion comprises a plurality of protruding portions disposed across the entire surface of the diffusion layer, the plurality of protruding portions having a same shape.

4. The backlight assembly according to claim 2, wherein the protruding portion has a prism shape prolonged in a direction corresponding to a length of the lamp.

5. The backlight assembly according to claim 2, wherein an internal angle between the first and second light path modulation surfaces is more than about 80° and less than about 120°.

6. The backlight assembly according to claim 5, wherein the internal angle between the first and second light pat modulation surfaces is approximately 90°.

7. The backlight assembly according to claim 1, wherein the first region at least covers an area in which the lamp is positioned when viewed in a plan view.

8. The backlight assembly according to claim 7, wherein the light path modulation member comprises at least one protruding portion, the at least one protruding portion is disposed on the first region.

9. The backlight assembly according to claim 8, wherein the at least one protruding portion comprises a plurality of protruding portions each having a same prism shape prolonged in a direction corresponding to a length of the lamp.

10. The backlight assembly according to claim 9, wherein each width of the plurality of protruding portions increases in proportion to a distance between a center of the first region and each of the plurality of protruding portions.

11. The backlight assembly according to claim 2, wherein an internal angle between the first and second light path modulation surfaces is more than about 80° and less than about 180°.

12. The backlight assembly according to claim 11, wherein the at least one protruding portion comprises a plurality of protruding portions, and an internal angle between the first and second light path modulation surfaces increases in proportion to a distance between a center of the first region and the protruding portion.

13. The backlight assembly according to claim 1, wherein the light path modulation member is integrally formed with the diffusion layer.

14. The backlight assembly according to claim 1, wherein the light path modulation member comprises an acrylic resin.

15. An LCD apparatus comprising:
at least one lamp that generates a first light;
a light diffusion member that is disposed over the lamp and diffuses the first light to generate a second light, the second light having a uniform brightness distribution, the light diffusion member comprising:
   a diffusion layer for diffusing the first light; and
   a light path modulation member protruded from the diffusion layer to modulate a path of the first light; and
an LCD panel for displaying an image in response to the second light from the light diffusion member, the LCD panel being disposed on the light diffusion member,
wherein the diffusion layer includes a first region from which the light path modulation member is protruded and a second region having a flat surface, the at least one lamp corresponding to the first region.

16. The LCD apparatus according to claim 15, wherein the light path modulation member comprises at least one protruding portion, the protruding portion comprising:
a first light path modulation surface inclined at a first angle with respect to a surface of the diffusion layer where the first light is inputted; and
a second light path modulation surface inclined at a second angle with respect to the surface of the diffusion layer.

17. The LCD apparatus according to claim 15, wherein the light path modulation member comprises at least one protruding portion, the protruding portion comprising:
a first light path modulation surface inclined at a first angle with respect to a surface of the diffusion layer where the second light is emitted; and
a second light path modulation surface inclined at a second angle with respect to the surface of the diffusion layer.

18. The LCD apparatus according to claim 17, wherein a width of the protruding portion is less than about 0.635mm.

19. The LCD apparatus according to claim 17, wherein the protruding portion comprises an edge defined by the first and second light path modulation surfaces.

20. The LCD apparatus according to claim 19, wherein the edge is rounded.

21. The LCD apparatus according to claim 15, further comprising:
a first receiving container combined with opposite end portions of the lamp for fixing the lamp, wherein the light diffusion member is disposed on the first receiving container;
a second receiving container comprising a bottom surface and a sidewall extended from the bottom surface for receiving the first receiving container;
a third receiving container disposed on the light diffusion member, for pressing the light diffusion member toward the first receiving container and supporting the LCD panel; and
a fourth receiving container combined with the second receiving container, for pressing the LCD panel toward the third receiving container.

22. The LCD apparatus according to claim 15, wherein the LCD apparatus is a direct illumination type LCD apparatus.

23. The backlight assembly of claim 1, wherein the backlight assembly comprises at least two lamps.

24. The backlight assembly of claim 23, further comprising a light reflection plate substantially parallel with the light diffusion member, and the at least two lamps are disposed between the light diffusion member and the light reflection plate.

25. The LCD apparatus of claim 15, wherein the LCD apparatus comprises at least two lamps.

26. The LCD apparatus of claim 25, further comprising a light reflection plate substantially parallel with the light diffusion member, and the at least two lamps are disposed between the light diffusion member and the light reflection plate.

27. The backlight assembly of claim 1, wherein the diffusion layer includes a first region corresponding to the at least one lamp and a second region corresponding to an area between the at least one lamp and another adjacent lamp; and
wherein the light path modulation member modulates a path of the first light input to the first region toward the second region.

28. The LCD apparatus of claim 15, wherein the diffusion layer includes a first region corresponding to the at least one lamp and a second region corresponding to an area between the at least one lamp and another adjacent lamp; and
wherein the light path modulation member modulates a path of the first light input to the first region toward the second region.

29. A backlight assembly comprising:
at least one lamp that generates a first light; and
a light diffusion member that is disposed over the lamp and diffuses the first light to generate a second light having a uniform brightness distribution, the light diffusion member comprising;
   a diffusion layer that diffuses the first light; and
   a light path modulation member protruded from the diffusion layer toward the lamp to modulate a path of the first light,
wherein the light path modulation member comprises at least one protruding portion, the protruding portion comprising:
a first light path modulation surface inclined at a first angle with respect to a surface of the diffusion layer; and
a second light path modulation surface inclined at a second angle with respect to the surface of the diffusion layer,
wherein the first and second light path modulation surfaces face the lamp.

30. The backlight assembly according to claim 29, wherein the at least one protruding portion comprises a plurality of protruding portions, and each width of the plurality of protruding portions increases in proportion to a distance between a center of a first region and each of the plurality of protruding portions.

31. The backlight assembly according to claim 29, wherein the at least one protruding portion comprises a plurality of protruding portions, and an internal angle between the first and second light path modulation surfaces increases in proportion to a distance between a center of a first region and the protruding portion.

* * * * *